United States Patent
Sha et al.

(10) Patent No.: US 9,031,040 B2
(45) Date of Patent: May 12, 2015

(54) METHOD AND DEVICE FOR INTER-SYSTEM HANDOVER FOR PACKET SWITCH SERVICE IN DUAL-MODE RADIO NETWORK CONTROLLER

(75) Inventors: Xiubin Sha, Shenzhen (CN); Jianwu Dou, Shenzhen (CN); Yazhu Ke, Shenzhen (CN); Lin Chen, Shenzhen (CN); Xiaohu Dong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 97 days.

(21) Appl. No.: 13/809,735

(22) PCT Filed: Jun. 23, 2011

(86) PCT No.: PCT/CN2011/076231
§ 371 (c)(1),
(2), (4) Date: Jan. 11, 2013

(87) PCT Pub. No.: WO2012/019490
PCT Pub. Date: Feb. 16, 2012

(65) Prior Publication Data
US 2013/0163563 A1      Jun. 27, 2013

(30) Foreign Application Priority Data
Aug. 12, 2010 (CN) .......................... 2010 1 0254977

(51) Int. Cl.
*H04J 3/24* (2006.01)
*H04L 12/66* (2006.01)
*H04M 1/66* (2006.01)
*H04W 36/00* (2009.01)
*H04W 72/00* (2009.01)
*H04W 36/10* (2009.01)
*H04W 36/14* (2009.01)
*H04W 12/02* (2009.01)
*H04W 72/04* (2009.01)
*H04W 88/12* (2009.01)

(52) U.S. Cl.
CPC .............. *H04W 36/10* (2013.01); *H04W 12/02* (2013.01); *H04W 36/14* (2013.01); *H04W 72/04* (2013.01); *H04W 88/12* (2013.01); *H04W 36/0038* (2013.01)

(58) Field of Classification Search
CPC . H04W 36/14; H04W 36/0022; H04W 36/10; H04W 36/00; H04W 12/10; H04W 12/06; H04W 48/18; H04W 36/0038; H04W 88/12; H04W 72/04; H04W 12/02; H04L 63/0853; H04L 63/062; H04L 2209/601; H04L 9/0822; H04N 21/835; H04N 7/1675
USPC ................... 370/349, 352; 455/410, 436, 453
See application file for complete search history.

(56) References Cited

U.S. PATENT DOCUMENTS

2002/0066011 A1 *   5/2002   Vialen et al. ................... 713/150
2003/0039361 A1 *   2/2003   Hawkes et al. ............... 380/278

(Continued)

FOREIGN PATENT DOCUMENTS

| CN | 1529532 A | 9/2004 |
| CN | 101026862 A | 8/2007 |
| WO | 2005034540 A1 | 4/2005 |

OTHER PUBLICATIONS

"UMTS Security;" Valtteri Niemi and Saisa Nyberg, Nokia Research Center, Finland, 2003, p. 54, and 63-69.*
International Search Report for PCT/CN2011/076231 dated Sep. 5, 2011.

*Primary Examiner* — Alpus H Hsu
*Assistant Examiner* — Elton Williams
(74) *Attorney, Agent, or Firm* — Ling and Yang Intellectual Property LLC

(57) ABSTRACT

A method and device for an inter-RAT handover for a PS service in a dual-mode RNC are disclosed in the present invention, which are used to support an inter-RAT handover optimization flow of the PS service in the dual-mode RNC, thereby solving the problem that the current inter-RAT handover optimization flow does not support the PS handover. With the present invention, in the inter-RAT handover optimization flow, an inter-RAT relocation flow and a radio resource allocation flow of a destination system are executed in parallel, and an encryption indication is sent to a central network through inter-RAT relocation required message; a BSC forwards user data to the central network according to the encryption indication.

12 Claims, 3 Drawing Sheets

(56) References Cited

U.S. PATENT DOCUMENTS

| | | |
|---|---|---|
| 2006/0035645 A1 | 2/2006 | Kim |
| 2006/0194580 A1* | 8/2006 | Gruber ........................ 455/436 |
| 2007/0070949 A1* | 3/2007 | Hwang et al. ................ 370/331 |
| 2007/0287459 A1* | 12/2007 | Diachina et al. ............. 455/436 |
| 2008/0123596 A1* | 5/2008 | Gallagher et al. ........... 370/331 |
| 2008/0192697 A1* | 8/2008 | Shaheen ...................... 370/331 |
| 2009/0073936 A1* | 3/2009 | Jentz et al. ................... 370/331 |

* cited by examiner

METHOD AND DEVICE FOR INTER-SYSTEM HANDOVER FOR PACKET SWITCH SERVICE IN DUAL-MODE RADIO NETWORK CONTROLLER

TECHNICAL FIELD

The present invention relates to the field of radio communication, and particularly, to a method and device for an inter-RAT handover for a Packet Switch (PS) service in a dual mode Radio Network Controller (RNC).

BACKGROUND OF THE RELATED ART

In a radio communication network, the mode of different radio access technologies operating simultaneously is a common network operation mode. In the network with different radio access technologies operating simultaneously, in order to implement network complementation when different radio access technologies operate simultaneously, handover of services between different radio access technologies is a basic function. Currently, conventional inter-RAT handover flow is: to inform a destination system to prepare radio resources through inter-RAT relocation message, and after the destination system returns relocation response message, initiate the inter-RAT handover flow, thus a handover delay is relatively longer; with regard to a high-speed mobile User Equipment (UE), the handover with a long delay easily causes a dropped call, which influences the handover performance and Quality of Service (Qos).

Iur-g is an interface between an RNC and a BSC, an inter-RAT handover optimization flow based on the Iur-g interface is disclosed in certain enterprise standards currently (with reference to FIG. 1), a radio resource allocation flow of a destination system is advanced before an inter-RAT relocation flow, an air-interface handover flow and the inter-RAT relocation flow are performed in parallel, thereby enhancing an inter-RAT handover success rate and reducing an inter-RAT handover delay. However, since an encryption node of the PS service in the 2nd Generation (2G) communication system is a Servicing GPRS Support Node (SGSN), and a 2G radio access network does not know the encryption situation, therefore, the optimization flow is only applied to the CS handover.

In a dual mode RNC, since the Radio Network Controller (RNC) in the 3rd Generation (3G) communication system and the Base Station Controller (BSC) in the 2nd Generation (2G) communication system are combined into one, and information between dual mode radio access networks can be interacted inside the dual mode RNC.

SUMMARY OF THE INVENTION

In the present invention, with respect to an encryption situation of a PS service and characteristics of a dual mode RNC, a method for an inter-RAT handover for the PS service in the dual mode RNC is disclosed, which is used to support an inter-RAT handover optimization flow of the PS service in the dual-mode RNC, thereby solving the problem that the current inter-RAT handover optimization flow does not support PS handover, and then an inter-RAT handover delay of the PS service can be shortened and an inter-RAT handover success rate of the PS service is improved.

In order to achieve the foregoing objects, the technical scheme of the present invention is implemented as follows.

A method for an inter-RAT handover for PS service in a dual mode RNC comprises:

in the process of hand over from an RNC system to a BSC system, executing inter-RAT relocation flow and radio resource allocation flow of a destination system in parallel, and before the radio resource allocation flow is completed, informing CN of encryption indication information;

the CN sending the encryption indication information to a BSC, and the BSC forwarding user data to the CN according to the encryption indication information.

Furthermore, the way of executing an inter-RAT relocation flow and a radio resource allocation flow of a destination system in parallel is:

the RNC sending Enhanced Relocation Resource Request message to the BSC; meanwhile, the RNC sending Relocation Required message to the CN, and carrying the encryption indication information in the Relocation Required message.

Furthermore, the method further comprises: after the BSC receives Handover Access message, and when the user data are received, forwarding the user data to the CN according to the encryption indication information; if the encryption indication information indicates that the user data are required to be encrypted, the BSC encrypting the user data to send to the CN; and if the encryption indication information indicates that the user data are not required to be encrypted, the BSC sending the user data to the CN directly.

Based on the above method, the present invention further provides a device for an inter-RAT handover for a PS service in a dual mode RNC, which comprises: an RNC, a BSC and a CN. During a process of executing the handover from an RNC system to a BSC system, the device executes an inter-RAT relocation flow and a radio resource allocation flow of a destination system in parallel; before the BSC completes the radio resource allocation flow, the RNC informs the CN of encryption indication information;

the CN sends the encryption indication information to the BSC, and the BSC forwards user data to the CN according to the encryption indication information.

In the present invention, with respect to an encryption situation of a PS service and characteristics of a dual mode RNC, a method for an inter-RAT handover for the PS service in the dual mode RNC is disclosed, which is used to support an inter-RAT handover optimization flow of the PS service in the dual-mode RNC, thereby solving the problem that the current inter-RAT handover optimization flow does not support PS handover, and then an inter-RAT handover delay of the PS service can be shortened and an inter-RAT handover success rate of the PS service is improved.

PREFERRED EMBODIMENTS OF THE PRESENT INVENTION

The optimization of an inter-RAT handover flow of a PS service is implemented by improving an inter-RAT handover optimization flow based on Iur-g interfaces in the present invention. In the present invention, with respect to an encryption situation of the PS service and characteristics of a dual mode RNC, a method for an inter-RAT handover for the PS service in the dual mode RNC is disclosed, which is used to support the inter-RAT handover optimization flow of the PS service in the dual-mode RNC, thereby shortening an inter-RAT handover delay of the PS service and enhancing an inter-RAT handover success rate of the PS service. The basic idea of the present invention is: in the inter-RAT handover optimization flow, executing an inter-RAT relocation flow and a radio resource allocation flow of a destination system in parallel, triggering a Central Network (CN) to send an encryption indication to a destination SGSN through inter-RAT Relocation Required message to indicate whether the destination SGSN is required to perform encryption. If the encryption is required, subsequent user data frames are sent through a BSC after being encrypted; and if the encryption is not required, the subsequent user data frames are sent directly (not required to be encrypted) through the BSC.

In order to make the object, technical scheme and advantages of the present invention more clear, the present invention will be further described in detail in combination with the examples and accompanying drawings below.

Figure 1:
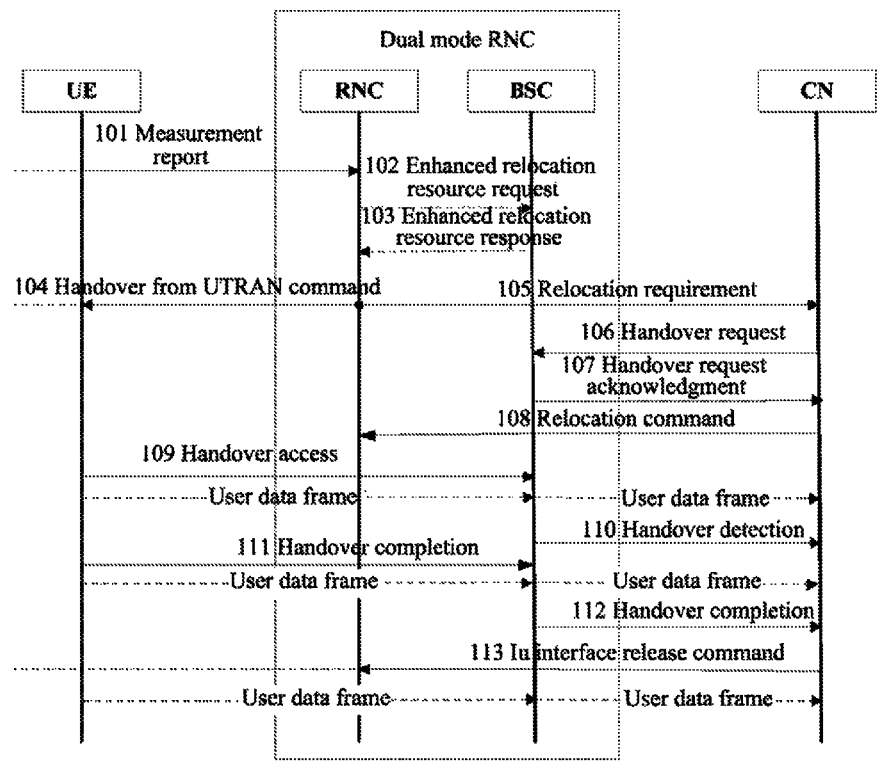
FIG. 1 is an inter-RAT handover optimization flow based on Iur-g interfaces in the related art.
Figure 2:
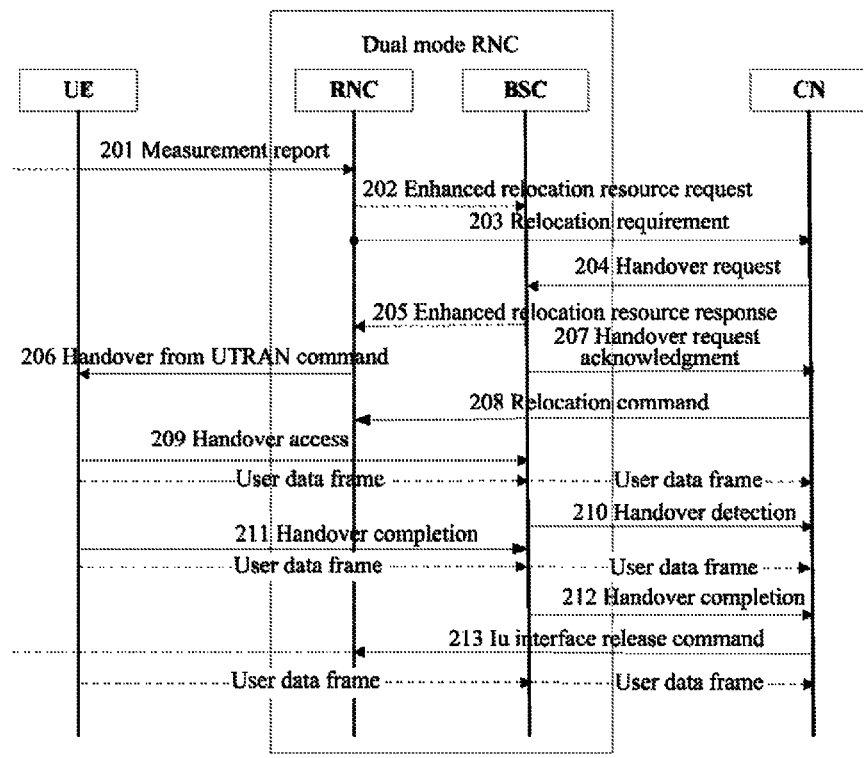
FIG. 2 is a schematic diagram of an inter-RAT handover optimization flow of the PS service in the dual-mode RNC according to the embodiment of the present invention.

FIG. 2 is a schematic diagram of an inter-RAT handover optimization flow of the PS service in the dual-mode RNC according to the embodiment of the present invention, and following steps are included.

In step 201, when a UE uses the PS service in a 3G network, if a handover condition is satisfied, and it is required to perform a handover to a neighboring 2G network, the UE sends a measurement report to an RNC, the RNC receives the measurement report from the UE, in combination with the cell capacity and load information of Global System for Mobile Communications (GSM) adjacent cells, the RNC determines to perform a handover to a certain GSM adjacent cell.

In step 202, the RNC sends Enhanced Relocation Resource Request message to a BSC for the UE, requests the BSC to reserve resources for the current UE; the BSC receives the request, allocates a Dedicated-Radio Network Temporary Identity (D-RNTI) and reserves radio resources for the UE, and embodies it into Old BSS to New BSS Information.

In step 203, the RNC sends Relocation Required message to a CN when sending the Enhanced Relocation Resource Request message, and carries encryption indication information in the Relocation Required message. The encryption indication information includes one or multiple kinds of following information: an identity to tell whether to be encrypted or not and an encryption algorithm type; the CN acquires the information such as whether user data are encrypted, the encryption algorithm type and so on through the message.

A 2G PS service encryption is performed on an SGSN in the central network, and a 3G encryption is performed at an RNC side, therefore, if 3G encrypted data need to be passed transparently to the 2G SGSN through the BSC, the 3G data needs to be encoded and decoded to convert into a 2G encoding mode in the BSC and then to be encrypted to transmit to the SGSN. In the present invention, the Relocation Required message is advanced, so as to enable the BSC to receive handover request message sent by the CN in advance, thereby obtaining information such as an encryption key and so on faster, and speeding a handover flow of the PS service.

In step 204, the CN sends Handover Request message to the BSC after receiving the Relocation Required message, and carries the encryption indication information in the Handover Request message.

In step 205, the BSC sends Enhanced Relocation Resource Response message to the RNC after receiving the Handover Request message sent by the CN, and carries related radio resource information reserved for the UE in the Enhanced Relocation Resource Response message. Meanwhile, as an alternative, the 2G cell capacity and load information can be carried in the response message.

In step 206, after receiving the Enhanced Relocation Resource Response message sent by the BSC, the RNC sends the related radio resource information reserved for the UE to the UE through a Handover From UTRAN Command, for short, a handover command.

In step 207, after completing the establishment of A interface resources, and associating with the reserved air interface radio resources according to D-RNTI information in the Old BSS to New BSS Information, the BSC sends Handover Request Acknowledge message to the CN, and carries the D-RNTI information allocated to the UE in the Handover Request Acknowledge message.

In step 208, the CN sends Relocation Command message to the RNC after receiving the Handover Request Acknowledge message of the BSC, and the Relocation Command message is used to inform the RNC that the handover operation at the CN side is completed.

In step 209, after receiving the Handover From UTRAN Command sent by the RNC in a source system and detecting 2G synchronization information, the UE sends Handover Access message to the BSC.

After the BSC in a destination system receives the Handover Access message, user data frames sent by the UE can be received, and since the encoding mode and encryption key types of the user data of the 2G network and 3G network are different, when the 3G data are forwarded to the SGSN through the BSC, the 3G data needs to be encoded and decoded to convert into a 2G encoding mode in the BSC and to be encrypted to transmit to the SGSN. In step 204, since the encryption indication information is obtained through the Handover Request message sent by the CN, the BSC forwards the user data to the CN according to the encryption indication information, if the encryption indication information indicates that the user data are required to be encrypted, the BSC encrypts the user data to send to the CN; and if the encryption indication information indicates that the user data are not required to be encrypted, the BSC sends the user data to the CN directly (not required to be encrypted).

In step 210, the BSC sends Handover Detect message to the CN after receiving the Handover Access message; the Handover Detect message is 2G network message defined by the 3GPP, and is used to inform the central network that the synchronization at the 2G radio side has been completed.

In step 211, after receiving the handover command, and completing the handover between access modes, the UE sends Handover Complete message to the BSC, and informs the BSC that the handover flow processing at the UE side is completed.

In step 212, the BSC sends the Handover Complete message to the CN after receiving the Handover Complete message sent by the UE.

In step 213, the CN sends Iu interface Release Command message to the RNC after receiving the Handover Complete message sent by the BSC, and the Iu interface is an interface between the central network and the RNC.

Figure 3:
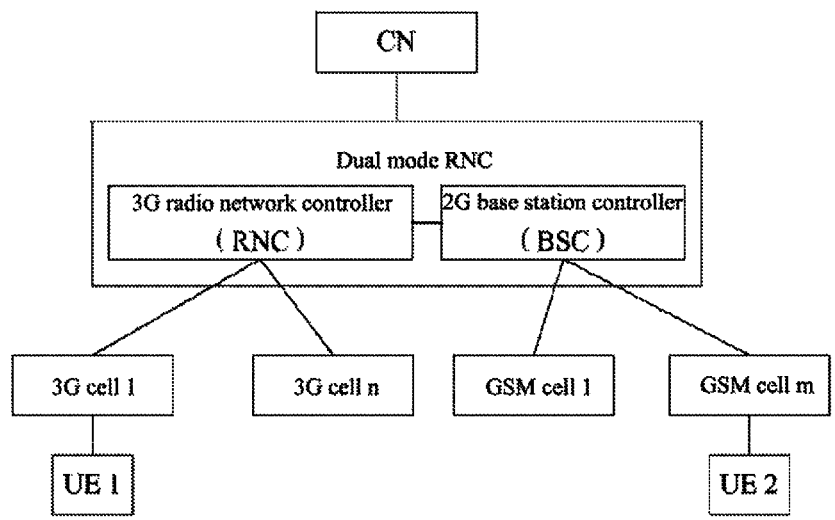
FIG. 3 is a schematic diagram of a network structure for implementing inter-RAT handover for the PS service in the dual-mode RNC according to the present invention.

The present invention also provides a device for an inter-RAT handover based on a dual-mode RNC. The device relates to the following three network elements: a Dual RAT Radio Network Controller (namely, a dual mode RNC), a CN and a UE. Wherein, information can be interacted mutually between two access modes of the dual mode RNC (RNC and BSC) through Iur-g interfaces, so as to complete a resource allocation notification of a destination radio access mode of the inter-RAT handover, and shorten a handover delay. FIG. 3 is a schematic diagram of a network structure for implementing the inter-RAT handover method for the PS service in the dual-mode RNC according to the present invention, and the device for an inter-RAT handover for the PS service in the dual-mode RNC disclosed by the present invention mainly includes three component parts: an RNC, a BSC and a CN. The device is characterized in: in a process of handing over from an RNC system to a destination BSC system, executing an inter-RAT relocation flow and a radio resource allocation flow of a destination system in parallel, when the RNC in the device sends Enhanced Relocation Resource Request message to the BSC, informing the CN of encryption indication information through Relocation Required message, and the RNC advancing the Relocation Required message so as to enable the BSC to receive Handover Request message sent by the CN in advance, thereby obtaining information such as an encryption key and so on faster, and speeding a handover flow of the PS service.

The BSC obtains the encryption indication information through the Handover Request message sent by the CN, and when receiving the user data, the BSC forwards the user data to the CN according to the encryption indication information, if the encryption indication information indicates that the user data are required to be encrypted, the BSC encrypts the user data to send to the CN; and if the encryption indication information indicates that the user data are not required to be encrypted, the BSC sends the user data to the CN directly (not required to be encrypted).

The above description is only the preferred example of the present invention, which is not used to limit the protection scope of the present invention.

Industrial Applicability

In the present invention, with respect to an encryption situation of a PS service and characteristics of a dual mode RNC, a method for inter-RAT handover for the PS service in the dual mode RNC is disclosed, which is used to support inter-RAT handover optimization flow of the PS service in the dual-mode RNC, thereby solving the problem that the current inter-RAT handover optimization flow does not support the PS handover, thus the inter-RAT handover delay of the PS service can be shortened and the inter-RAT handover success rate of the PS service is improved.

What is claimed is:

1. A method for an inter-RAT handover for a Packet Switch (PS) service in a dual mode Radio Network Controller (RNC), to support the inter-RAT handover optimization flow of the PS service in the dual-mode RNC, thereby shortening an inter-RAT handover delay of the PS service and enhancing an inter-RAT handover success rate of the PS service, comprising:

in a process of handing over a PS service from an RNC system to a destination Base Station Controller (BSC) system within a dual mode RNC, wherein the dual mode RNC comprises the RNC system and the destination BSC system, executing an inter-RAT relocation flow and a radio resource allocation flow of the destination BSC system in parallel, and before the radio resource allocation flow is completed, informing a Central Network (CN) of encryption indication information;

the CN sending the encryption indication information to the BSC, and the BSC forwarding user data to the CN according to the encryption indication information.

2. The method according to claim 1, wherein, a way of executing an inter-RAT relocation flow and a radio resource allocation flow of the destination BSC system in parallel is:

the RNC sending an Enhanced Relocation Resource Request message to the BSC; meanwhile, the RNC sending a Relocation Required message to the CN, and carrying the encryption indication information in the Relocation Required message.

3. The method according to claim 2, further comprising:

after receiving a handover request message sent by the CN, the BSC sending a Handover Request Acknowledge message to the CN, and carrying Dedicated-Radio Network Temporary Identity (D-RNTI) information allocated to a UE in the Handover Request Acknowledge message;

after receiving the Handover Request Acknowledge message from the BSC, the CN sending a Relocation Command message to the RNC, and informing the RNC that the handover at the CN side has been completed.

4. The method according to claim 1, wherein, a way of the BSC forwarding user data to the CN according to the encryption indication information is:

after the BSC receives a Handover Access message, and when the user data are received, forwarding the user data to the CN according to the encryption indication information; if the encryption indication information indicates that the user data are required to be encrypted, the BSC encrypting the user data to send to the CN; and if the encryption indication information indicates that the user data are not required to be encrypted, the BSC sending the user data to the CN directly.

5. A network system for an inter-RAT handover for a Packet Switch (PS) service in a dual mode Radio Network Controller (RNC), to support the inter-RAT handover optimization flow of the PS service in the dual-mode RNC, thereby shortening an inter-RAT handover delay of the PS service and enhancing an inter-RAT handover success rate of the PS service, comprising:

a dual mode RNC and a Central Network (CN), wherein, during a process of handing over a PS service from an RNC system to a destination BSC system within the dual mode RNC, wherein the dual mode RNC comprises the RNC system and the destination BSC system, an inter-RAT relocation flow and a radio resource allocation flow of the destination BSC system are executed in parallel;

before the BSC completes the radio resource allocation flow, the RNC informs the CN of encryption indication information;

the CN sends the encryption indication information to the BSC, and the BSC forwards user data to the CN according to the encryption indication information.

6. The network system according to claim 5, wherein, the RNC sends an Enhanced Relocation Resource Request message to the BSC, and meanwhile informs the CN of the encryption indication information through a Relocation Required message.

7. The network system according to claim 6, wherein, the BSC is further configured to: send a Handover Request Acknowledge message to the CN, and carry Dedicated-Radio Network Temporary Identity (D-RNTI) information allocated to a UE in the Handover Request Acknowledge message;

the CN is further configured to: receive the Handover Request Acknowledge message of from the BSC, send a Relocation Command message to the RNC, and inform the RNC that the handover at the CN side has been completed.

8. The network system according to claim 5, wherein, after the BSC receives a Handover Access message, and when the user data are received, the BSC forwards the user data to the CN according to the encryption indication information; if the encryption indication information indicates that the user data are required to be encrypted, the BSC encrypts the user data to send to the CN; and if the encryption indication information indicates that the user data are not required to be encrypted, the BSC sends the user data to the CN directly.

9. The method according to claim 2, wherein, a way of the BSC forwarding user data to the CN according to the encryption indication information is:

after the BSC receives a Handover Access message, and when the user data are received, forwarding the user data to the CN according to the encryption indication information; if the encryption indication information indicates that the user data are required to be encrypted, the BSC encrypting the user data to send to the CN; and if the encryption indication information indicates that the user data are not required to be encrypted, the BSC sending the user data to the CN directly.

10. The method according to claim 3, wherein, a way of the BSC forwarding user data to the CN according to the encryption indication information is:

after the BSC receives a Handover Access message, and when the user data are received, forwarding the user data to the CN according to the encryption indication information; if the encryption indication information indicates that the user data are required to be encrypted, the BSC encrypting the user data to send to the CN; and if the encryption indication information indicates that the user data are not required to be encrypted, the BSC sending the user data to the CN directly.

11. The network system according to claim 6, wherein, after the BSC receives a Handover Access message, and when the user data are received, the BSC forwards the user data to the CN according to the encryption indication information; if the encryption indication information indicates that the user data are required to be encrypted, the BSC encrypts the user data to send to the CN; and if the encryption indication information indicates that the user data are not required to be encrypted, the BSC sends the user data to the CN directly.

12. The network system according to claim 7, wherein, after the BSC receives a Handover Access message, and when the user data are received, the BSC forwards the user data to the CN according to the encryption indication information; if the encryption indication information indicates that the user data are required to be encrypted, the BSC encrypts the user data to send to the CN; and if the encryption indication information indicates that the user data are not required to be encrypted, the BSC sends the user data to the CN directly.

* * * * *